(12) United States Patent
Shmueli et al.

(10) Patent No.: US 10,960,991 B2
(45) Date of Patent: Mar. 30, 2021

(54) CONTROL SYSTEM AND METHOD FOR UNMANNED AERIAL VEHICLES

(71) Applicant: Technion Research & Development Foundation Limited, Haifa (IL)

(72) Inventors: Oded Shmueli, Nofit (IL); Ehud Behar, Zikhron-Yaakov (IL)

(73) Assignee: Technion Research & Development Foundation Limited, Haifa (IL)

( * ) Notice: Subject to any disclaimer, the term of this patent is extended or adjusted under 35 U.S.C. 154(b) by 0 days.

(21) Appl. No.: 16/218,545

(22) Filed: Dec. 13, 2018

(65) Prior Publication Data

US 2019/0118979 A1   Apr. 25, 2019

Related U.S. Application Data (62) Division of application No. 15/058,212, filed on Mar. 2, 2016.

(60) Provisional application No. 62/127,351, filed on Mar. 3, 2015, provisional application No. 62/126,860, filed on Mar. 2, 2015.

(51) Int. Cl.
| | | |
|---|---|---|
| *B64G 1/10* | (2006.01) | |
| *B64G 1/22* | (2006.01) | |
| *B64G 1/42* | (2006.01) | |
| *B64G 1/64* | (2006.01) | |
| *B64G 1/66* | (2006.01) | |
| *B64C 39/02* | (2006.01) | |

(52) U.S. Cl.
CPC .......... *B64G 1/1085* (2013.01); *B64C 39/024* (2013.01); *B64G 1/10* (2013.01); *B64G 1/222* (2013.01); *B64G 1/425* (2013.01); *B64G 1/64* (2013.01); *B64G 1/66* (2013.01); *B64C 2201/143* (2013.01); *B64G 2001/643* (2013.01)

(58) Field of Classification Search
CPC .......... B64G 1/425; B64G 1/443; B64G 1/66; B64G 3/00; B64C 2201/024; B64C 2201/146; B64C 2201/12
See application file for complete search history.

(56) References Cited

U.S. PATENT DOCUMENTS

| | | |
|---|---|---|
| 3,564,253 A | 2/1971 | Buckingham |
| 3,817,620 A | 6/1974 | Suzaki et al. |
| 5,307,194 A | 4/1994 | Hatton et al. |
| 5,886,499 A | 3/1999 | Hall |
| 5,949,594 A | 9/1999 | Iglseder et al. |
| 5,984,239 A | 11/1999 | Chen |
| 6,002,360 A | 12/1999 | Wolcott et al. |
| 6,195,044 B1 | 2/2001 | Fowell |
| 6,222,658 B1 | 4/2001 | Dishman et al. |
| 7,593,641 B2 | 9/2009 | Tegge, Jr. |
| 7,925,167 B1 | 4/2011 | Kozubal et al. |
| 9,346,563 B1 | 5/2016 | Martin |

(Continued)

OTHER PUBLICATIONS

Official Action dated Oct. 3, 2019 From the US Patent and Trademark Office Re. U.S. Appl. No. 15/058,212. (28 Pages).

(Continued)

*Primary Examiner* — Philip J Bonzell
*Assistant Examiner* — Tye William Abell (57) ABSTRACT

A method and control system for controlling unmanned aerial vehicles to fly in coordinated manner, comprises arranging the unmanned aerial vehicles, each of which has an illumination element in a flying formation, and operating selected illumination elements to produce a display in which a pattern, shape or letters or words are detectable at a predetermined ground location.

4 Claims, 7 Drawing Sheets

(56) References Cited

U.S. PATENT DOCUMENTS

| | | | |
|---|---|---|---|
| 9,673,889 B2 | 6/2017 | Platzer et al. | |
| 10,078,328 B1 | 9/2018 | Slater | |
| 2006/0145024 A1 | 7/2006 | Kosmas | |
| 2007/0253713 A1 | 11/2007 | Reilly et al. | |
| 2009/0324236 A1 | 12/2009 | Wu et al. | |
| 2010/0123040 A1* | 5/2010 | Baxter | F21V 3/023 244/31 |
| 2011/0211250 A1 | 9/2011 | Laine et al. | |
| 2011/0240801 A1 | 10/2011 | Manzoni | |
| 2012/0072054 A1 | 3/2012 | Fisher | |
| 2012/0223189 A1 | 9/2012 | Kuninaka | |
| 2013/0147952 A1 | 6/2013 | Englert | |
| 2013/0314502 A1* | 11/2013 | Urbach | H04N 7/181 348/46 |
| 2014/0231590 A1* | 8/2014 | Trowbridge | A63H 27/12 244/175 |
| 2015/0372380 A1 | 12/2015 | Judd et al. | |
| 2015/0375876 A1 | 12/2015 | Garber | |
| 2016/0112117 A1 | 4/2016 | Platzer et al. | |
| 2016/0253284 A1 | 9/2016 | Cappaert et al. | |
| 2016/0254858 A1 | 9/2016 | Cappaert et al. | |
| 2016/0257432 A1 | 9/2016 | Shmueli et al. | |
| 2017/0137125 A1* | 5/2017 | Kales | G09F 21/10 |
| 2018/0157930 A1 | 6/2018 | Rutschman et al. | |
| 2018/0167586 A1 | 6/2018 | Rutschman et al. | |
| 2019/0118980 A1 | 4/2019 | Shmueli et al. | |

OTHER PUBLICATIONS

Official Action dated Oct. 7, 2019 From the US Patent and Trademark Office Re. U.S. Appl. No. 16/218,556. (24 Pages).

Wikipedia "European Space Operations Centre", Retrieved from Wikipedia.com, 5 Pages, May 31, 2014.

Official Action dated Mar. 19, 2019 From the US Patent and Trademark Office Re. U.S. Appl. No. 15/058,212. (33 pages).

Google "Define Momentary", retrieved from google.com, Mar. 13, 2019.

Wikipedia "Magnetorquer", retrieved from wikipedia.org, 2 Pages, Jun. 8, 2013.

Official Action dated Nov. 27, 2018 From the US Patent and Trademark Office Re. U.S. Appl. No. 15/058,212. (27 Pages).

Restriction Official Action dated Jul. 25, 2018 From the US Patent and Trademark Office Re. U.S. Appl. No. 15/058,212. (11 pages).

Bock et al. "Highly Miniaturized FEEP Thrusters for CubeSat Applications", Proceedings of the 4th Spacecraft Propulsion Conference, vol. 2967498, pp. 1-10, May 2014.

Mouser Electronics "Ultraviolet LEDs", Mouser.com, Archived by the Internet Archive on May 17, 2013, 2 pages.

Stacey "NASA to Launch Students' Nanosatellite", Brown University News from Brown, Feb. 11, 2014, 6 pages.

Tutten "CubeSats Provide Big Opportunities in Small Packages", Spaceflight Insider, Apr. 26, 2014, 6 pages.

Tweddle et al. Extract from "Computer Vision Based Navigation for Spacecraft Proximity Operations", Doctoral Dissertation, Massachusetts Institute of Technology, Feb. 2010, 10 pages.

Advisory Action Before the Filing of an Appeal Brief dated Oct. 22, 2020 From the US Patent and Trademark Office Re. U.S. Appl. No. 15/058,212. (2 Pages).

Final Official Action dated Jul. 9, 2020 from the US Patent and Trademark Office Re. U.S. Appl. No. 15/058,212. (15 pages).

Official Action dated Nov. 20, 2020 From the U.S. Patent and Trademark Office Re. U.S. Appl. No. 15/058,212. (12 pages).

* cited by examiner

CONTROL SYSTEM AND METHOD FOR UNMANNED AERIAL VEHICLES

RELATED APPLICATIONS

This application is a division of U.S. patent application Ser. No. 15/058,212 filed on Mar. 2, 2016 which claims the benefit of priority under 35 USC 119(e) of U.S. Provisional Patent Application Nos. 62/127,351 filed on Mar. 3, 2015 and 62/126,860 filed on Mar. 2, 2015. The contents of the above applications are all incorporated by reference as if fully set forth herein in their entirety.

FIELD AND BACKGROUND OF THE INVENTION

The present invention, in some embodiments thereof, relates to displays in space that are observable from the ground, and, more particularly, but not exclusively, to a satellite and control arrangement to provide such a display.

There have been proposals for creating signs in space that would be visible from the ground, for example—for advertising purposes.

Known solutions require large satellites and expensive (heavy) deployment mechanisms and resources.

An example of the existing art is US Patent Application No. 2012/0223189 published Sep. 12, 2012 of Hitoshi Kuninaka, which relates to an apparatus and method for generating a flash of light towards the earth from a satellite. The suggested method is to use reflection of sunlight and thus save on the high costs associated with allowing a battery operated satellite to produce enough light to be viewed from earth. Occasionally, an antenna reflects sunlight directly down at Earth, creating a predictable and quickly moving illuminated spot on the surface below of about 10 km (6.2 mi) diameter. To an observer this looks like a bright flash, or flare in the sky, with a duration of a few seconds. Reflection of sun light from satellites is carried out in a single stage, and depends on orbit, location, and angular state of satellites with respect to points of interest on earth.

The suggestion is based on the concept of the so-called Iridium flares that can be seen on earth from the low earth orbit Iridium satellite constellation. An array of satellites is mentioned although there is no discussion of the practicality of having any large number of suitably equipped satellites.

SUMMARY OF THE INVENTION

The present embodiments provide an array of nanosatellites for forming the sign. The present embodiments may provide display of changing signs over different territories and time windows. The nanosatellites allow for multiple illumination points in a matrix to provide letters and words, and yet can be conveniently launched from a single launch mission.

According to an aspect of some embodiments of the present invention there is provided a nanosatellite carrying an illumination element, the illumination element configured for sustained external illumination. The illumination element may comprise a light emitting diode, battery power sufficient to illuminate said lamp for at least a minute, and photovoltaic recharging ability. The nanosatellites may have control ability to position themselves with other nanosatellites in a predetermined array, and/or to operate said lamp in coordination with said other nanosatellites, thereby to provide an illumination event visible from the ground.

The nanosatellites may have directional capability to point said illumination element towards ground.

In an embodiment, the illumination element is releasable.

The nanosatellite may have control ability to position itself with other nanosatellites in an array, and to release said illumination element in coordination with said other nanosatellites, thereby to provide an illumination event visible from the ground.

The nanosatellite may position itself with other nanosatellites in an array and carry a wire connected to at least one other of said nanosatellites in said array, at least one additional illumination element being located on said wire.

The nanosatellite may alternatively position itself with other nanosatellites in an array while holding a sheet connected to others of said nanosatellites in said array.

In an embodiment, said illumination element is a mirror, said mirror being directable to deflect focused light from another satellite source at the ground.

According to a second aspect of the present invention there is provided a ground-based satellite control system configured to control a first array of nanosatellites in low earth orbit to produce an illumination event visible at a predetermined ground location.

In an embodiment, said first array comprises at least one matrix of illumination positions, said matrix sized such that controllable switching of said illumination positions forms letters visible from said predetermined ground location.

The control system may switch said illumination positions to change said letters during said illumination event.

The control system may control a second array of nanosatellites to shine focused light onto said first array for redirection by said first array.

The control system may schedule said illumination event along with other illumination events in accordance with available battery power on board said nanosatellites and in accordance with recharging opportunities of an orbit of said nanosatellites.

The control system may add additional available nanosatellites to said first array according to requirements of an illumination event.

The control system may control an illumination event to fit in with a duration during which said first array is visible over said predetermined ground location.

According to a third aspect of the present invention there is provided a method of controlling nanosatellites comprising:

arranging said nanosatellites in a first array in low earth orbit; and operating illumination elements in association with said nanosatellites to produce an illumination event visible at a predetermined ground location.

In embodiments, the illumination element, and the event as a whole, may be in a frequency range outside of a visible part of the spectrum, such as infra-red.

A further aspect of the present invention may provide a method of controlling unmanned aerial vehicles comprising:

arranging said unmanned aerial vehicles in a flying formation; and operating illumination elements in association with said unmanned aerial vehicles to produce an illumination event visible at a predetermined ground location.

A ground-based control system may control a first array of unmanned aerial vehicles in flight to produce an illumination event visible at a predetermined ground location.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data.

Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to displays in space that are observable from the ground, and, more particularly, but not exclusively, to a satellite and control arrangement to provide such a display.

The present inventions relate to the use of nanosatellites operating in an array to form a sign in space that may be observed on the ground. While the light from any individual satellite may not be meaningful, the array as a whole forms signs that are within the resolving power of the ground based human eye.

The present embodiments address issues relating to the way in which signs may be formed in light of constraints on available energy, and these include ways to exploit sunlight.

Forming a sign in space is a challenging undertaking, and the present embodiments may provide a practical and economic solution compared to the existing art. Nano-satellite technology is now capable of providing formation flight of multiple nanosatellites.

A possible commercial application is advertising. Other applications include major national celebrations, where for example the sign could be coordinated with a fireworks display, and disaster warnings.

The present embodiments may rely on advances in nanosatellite control and thrusters, and may utilize a multitude of satellites. Thus, a swarm of satellites, flying in formation with about 200 m between adjacent satellites, with light-power control, may display a pattern over a territory and at a time as specified.

In one embodiment, more lengthy messages may be scrolled over the display just as with a conventional dot-matrix-type display. Dropped display elements that shine but cannot maneuver is another option.

The challenge of using nanosatellites is that human low light or scotopic vision is sensitive to less than 100 visible (say green) photons per second, or light power of $\sim 3 \times 10^{-10}$ erg/s or $3 \times 10^{-17}$ Watt. A LED (Light Emitting Diode) may be connected to a satellite battery. A LED is a very efficient light source so that a battery is sufficient to produce the needed power output to provide sufficient lighting power for the short time interval when the satellite is in view of the location of interest. After a few minutes the satellite moves out of sight, and the battery can be recharged. Furthermore LED lights do not take up much space.

At a distance of d=600 km above the ground, which is a stable LEO orbit, the satellite may provide non-beamed light. Two Watts of light are sufficient for night visibility in good weather and visibility conditions.

Reflective panels may be added to the satellite. At certain observing angles, the reflective panels of the satellite may augment the electrically produced luminosity.

A mother ship with extra satellites and fuel may be provided to manage the swarm of nano satellites.

A system of lenses and mirrors can be used for early evening displays to divert sun light onto the system, and thus solve the problem of powering the display, at the cost of losing most of the night.

Very large sheets can be supported by the satellites and may use illumination powered by thin photovoltaic illumination elements, or projection, or may use reflection by lenses and mirrors.

The present embodiments provide interesting possibilities for advertising and publicity in general, and can be used to provide instant warnings over large geographical areas, for example to warn of a tsunami. The embodiments can be used as part of a national event, to provide a non-standard greeting, and could even be used for global computer games.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
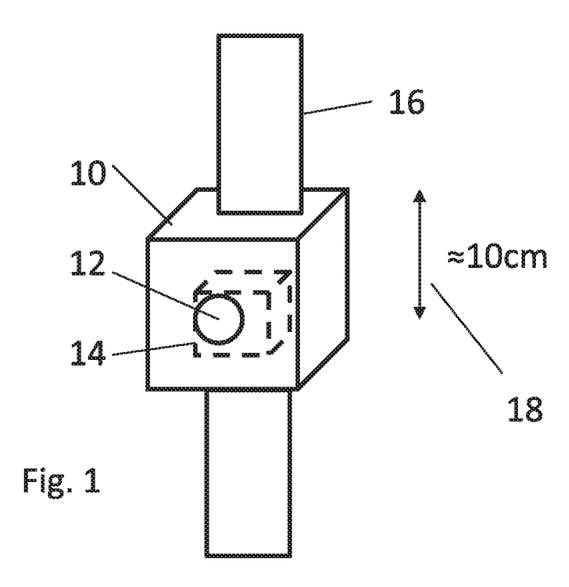
FIG. 1 is a simplified diagram illustrating a battery powered nanosatellite according to an embodiment of the present invention.

Referring now to the drawings, FIG. 1 illustrates a nanosatellite 10 carrying an illumination element 12. The illumination element is an element that provides sustained external illumination, as opposed to a flash, which provides momentary illumination or an indicator light which does not illuminate anything but merely indicates that certain equipment is working or in a given state.

Illumination element 12 may be a light emitting diode (LED), in particular an array of short wavelength, white or blue, LEDs, as these provide considerable illumination for minimal power and are reasonably robust to space flight. The nanosatellite may contain a battery 14 to power the illumination, and the available battery power may be sufficient to illuminate the lamp for at least a minute. Satellite 10 may also include photovoltaic recharging ability.

Nanosatellite 10 has a weight of between around 1 kg and 10 kg, and a typical size of a nanosatellite is a side length of 100 mm, or several units thereof, as indicated by arrow 18. An advantage of using nanosatellites is that they are on the one hand large enough to provide sufficient illumination for a reasonable amount of time and on the other hand are small enough that launching enough satellites to form an array is feasible. In fact several arrays can be launched using a single medium sized rocket.

Herein, reference to a nanosatellite includes satellites that are smaller than conventionally recognized as a nanosatellites as long as they are able to carry an illumination element which, when placed in an array with other nanosatellites can provide illumination visible on the ground from LEO.

Figure 2:
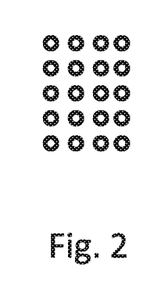
FIG. 2 is a simplified diagram illustrating a 4×5 nanosatellite array for use in the present embodiments.

Reference is now made to FIG. 2, which is a simplified schematic diagram showing an array of nanosatellites in orbit according to a preferred embodiment of the present invention. The nanosatellites may have control ability to position itself with other nanosatellites in predetermined array. The control ability provides the nanosatellites with the ability to maneuver themselves in orbit and therefore maintain themselves in an array. It is noted that changing orbit is very expensive in terms of energy but minor changes for stability or maintenance of an array are more suitable for battery and solar powered satellites. The command for controlling the array may come from another of the nanosatellites, from a mother satellite or from a ground station.

Figure 3:
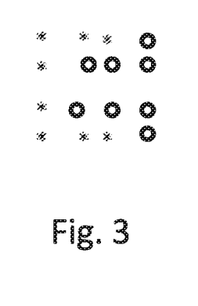
FIG. 3 is a simplified diagram showing the letter 'c' being displayed on a 4×4 array of nanosatellites according to an embodiment of the present invention.

The array of nanosatellites may be controlled to provide sufficient distance between the satellites to accord with the eye's ability to resolve shapes from the ground, to ensure that particular shapes or letters are visible during the event. FIG. 3 illustrates how certain of the nanosatellites in the array of FIG. 2 can have their illumination switched on to form a letter or character, in this case the letter 'c'.

The individual satellites may have directional capability to enable them to direct the illumination element towards the ground.

In one embodiment the illumination element is releasable. For example a flare carrying component could be released from the satellite and lit. As long as all the satellites in the matrix release elements at the same time the matrix formation will be retained by the released elements. Upon release the flare or other illumination may be lit.

The satellites in the matrix are controlled to coordinate illumination and to coordinate their flight.

In one embodiment, the nanosatellites in the array suspend an electrically conducting wire between them, and additional illumination elements are mounted on the wire. The result is that a matrix can have more illumination points than the number of available nano satellites.

In a further embodiment, the nanosatellites may hold up a sheet. Light may be projected onto the sheet to form a screen. As will be discussed below, for the projected image to be visible on the ground the sheet may have to be of the order of magnitude of a square kilometer in size.

In an embodiment, the illumination element 14 is a mirror, which can be directed to deflect focused light from another satellite source at the ground. Light can be deflected from the sun or focused light can be provided from a second array of satellites, as will be discussed in greater detail below.

Figure 4:
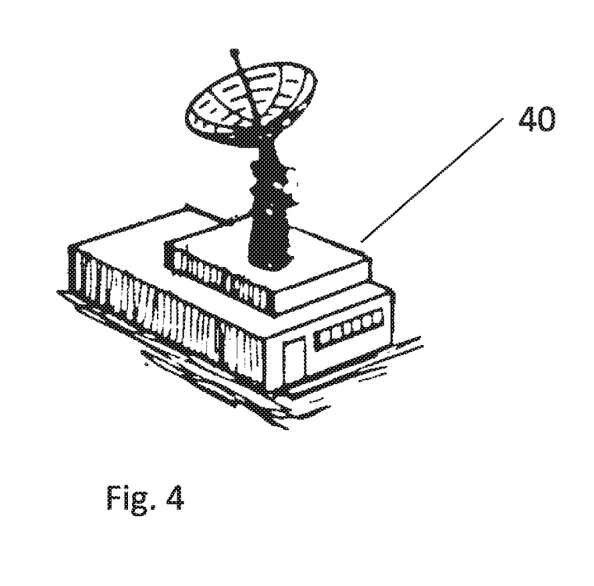
FIG. 4 is a simplified diagram illustrating a ground station that might be used to control nanosatellites according to the present embodiments, or relay control signals to the nanosatellites.

Reference is now made to FIG. 4, which illustrates a ground station 40 for controlling the satellites and satellite array or arrays. The satellites and the illumination events are typically controlled at a ground station such as illustrated ground station 40. The ground-based satellite control system may control arrays of nanosatellites in low earth orbit to produce the illumination events to be visible at given ground locations at given times.

The array being controlled may comprise a matrix of illumination positions as in FIG. 2 discussed above. The matrix may be of a size to allow controllable switching of the illumination positions to form letters visible from the ground during the event. The distance between the satellites determines the matrix size. The letters may be switched during the illumination event to change the letters as needed. Typically the satellites are visible at a given location for one or two minutes, allowing the letters to change several times or to give the appearance of scrolling the letters.

The ground control may control a second array of nanosatellites to shine focused light onto the first array for redirection by the first array towards the ground. The second array may be equipped with lenses to focus sunlight towards the first array, now in darkness, so as to enable the first array to reflect the sunlight towards the ground.

The satellite array is ideally used in the most efficient way possible. Events are only visible at night, and the batteries can only recharge in the sunlight, so that battery capacity determines how many events may be accommodated in a single orbit. If the batteries can provide about two minutes of illumination then only a single event can be accommodated per orbit. The ground control may schedule multiple illumination events to make the most efficient use of the available battery power and to avoid a schedule of events that is beyond the available battery power.

Now in fact during an event there may be some array positions, which are unused or only used very lightly. So it may often be possible to generate a smaller but still operational matrix for a subsequent event even though some satellites may have run out of power. Thus the ground control may track the different satellites to determine the battery charge on each satellite. Furthermore, batteries tend to deteriorate over a lifetime of charging and recharging, and the lifetime effect may be taken into account by the ground controller.

The ground controller may also add additional available nanosatellites to the array as needed by a given event.

Typically, events require the satellites to be visible at a particular time. However, satellites are limited by their orbits, and ground control can control the satellites to illuminate while they are visible from the required location. Furthermore, the ground control can reschedule a given event for a later orbit as needed, in which case the ground location needs to be notified.

Figure 5:
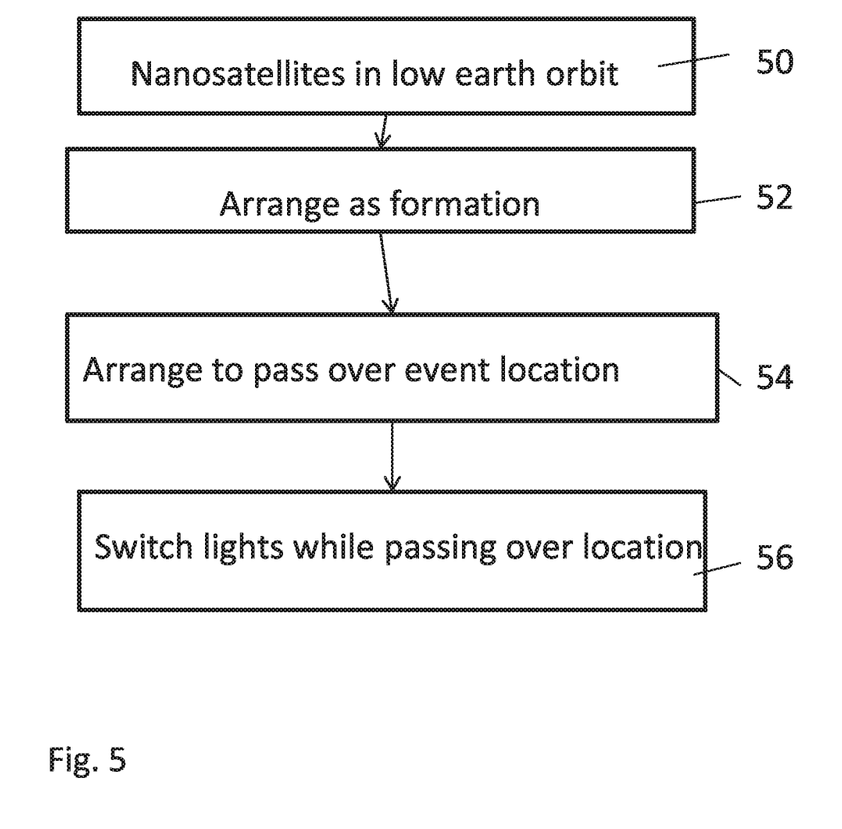
FIG. 5 is a simplified flow chart illustrating a procedure for arranging nanosatellites as an array in low earth orbit and controlling the satellites to provide a display to be viewed at a pre-arranged location on the ground.

Reference is now made to FIG. 5, which is a simplified flow chart illustrating a procedure for providing illumination events. The nanosatellites are placed in low earth orbit 50 and are controlled to fly together in formation 52, typically as an array. The satellites are then controlled to pass 54 within view of an event location and then the event itself consists of the satellites switching on illumination in a controlled manner while in view of the event location and during the time of the event.

As discussed, the array provides a matrix of illumination positions, and controllable switching of the illumination positions forms letters, logos, designs and even images, which may then be viewed from the ground location. Depending on the number of satellites available, slogans can be displayed altogether or one word at a time, and words can be displayed altogether or one letter at a time.

As mentioned, illumination may be via illumination elements on the satellites themselves, or by dropped elements that are released from the satellites and switch themselves on or by use of reflected light.

The embodiments are now considered in greater detail. Today, information addressed to the public, from advertisements to greetings to public information to warnings and everything in between, is ubiquitous and is made available through all kinds of available media.

The present embodiments may provide an additional medium to address the public. The idea is to display the information from space in such a way as to be visible on earth. The present embodiments may use satellites, typically in Low Earth Orbit (LEO) for creating a visual effect of a sign. The term low Earth orbit (LEO) is an orbit around Earth with an altitude between 160 kilometers (99 mi), (orbital period of about 88 minutes), and 2,000 kilometers (1,200 mi) (about 127 minutes). In order to avoid drag from atmospheric gases, an altitude of at least 300 km is generally chosen for satellites. Higher orbits on the other hand would require greater illumination in order to be visible.

The present embodiments may use multiple satellites, in arrays or swarms, to create letters, words and images. The individual satellites may be nanosatellites, whose movement is controlled together, each having a light, typically an LED light and acting as a pixel of the array. The term "nanosatellite" or "nanosat" is applied to an artificial satellite with a wet mass, meaning the mass including fuel, of between 1 and 10 kg (2.2 and 22.0 lb). Designs and proposed designs of these types may be launched individually, or they may have multiple nanosatellites working together or in formation, in which case, sometimes the term "satellite swarm" or "fractionated spacecraft" may be applied. As discussed herein, some designs require a larger mother satellite for communication with ground controllers or for launching and docking with nanosatellites.

With continued advances in the miniaturization and capability increase of electronic technology and the use of satellite constellations, nanosatellites are increasingly capable of performing commercial missions that previously required micro satellites.

Satellite classifications according to size are nanosatellites as above, picosatellites, which have a mass of between 0.1 kg and 1 kg, femtosatellites, which have a mass below 0.1 kg and usually require a mother ship, microsatellites, whose weight lies between 10 kg and 100 kg, and small satellites which lie between 100 and 500 kg.

An example of a nano-satellite is the CubeSat, shown in FIG. 1, which is currently widely used for space research. The CubeSat specification defines a volume of exactly one litre (103 cm3), with a mass of no more than 1.33 kilograms, and typically uses commercial off-the-shelf components for its electronics. Several companies build nanosatellites to the CubeSat specification, such as large-satellite-maker Boeing.

A further example of a nano-satellite is the Mepsi, made by NASA.

With the development of small, efficient propulsion thrusters, as well as algorithms for maintaining relative positioning of satellites over time, it is now possible to achieve nanosatellite arrays and swarming effects as described herein.

A first method for achieving the effect is referred to herein as point-source swarm flight. To create a sign, say consisting of the letter "C", one needs about 5 satellites standing for points along the curve, at say equal spacing. Similarly, for the letter "I" one needs 3 to 4 satellites. Of course, the more satellites per letter, the more accurate the display will be, see FIGS. 2 and 3. Once the relative positioning is achieved, so as to be seen from earth, and for an appropriate duration, the satellites forming the letter or letters of the sign, will shine and continue orbiting earth. The timing is carefully designed so as to create the effect above the desired area and at the desired time. Due to optical limitations, the time of display will usually be limited to the duration of dusk to dawn although certain extensions, using mirrors and lenses as described subsequently, may achieve longer visibility.

It is noted that due to energy consumption, without using a lens and mirror extension, and considering the rapidness of overhead transit in LEO, the visibility period may be limited in duration to a few minutes at a time, followed by a recharging period. The energy is limited by the battery size, and the battery size is limited by the weight limit of the nano satellite.

Logos and other complex signs may be displayable as discussed above, the limiting factor being the number of satellites.

In an embodiment, an array of satellites may fly in a fixed array where each satellite is one pixel of the array. The letters or signs are formed by switching on the lights of the satellites whose pixels are required by the sign and leaving the others switched off. In this way, no shuffling around of the satellites is needed when the message is changed.

Another technique is partial-showing, that is displaying the sign in portions. To illustrate this idea consider an array of six satellites displaying the term "COKE"™ one letter at a time. First, the six display C; Then they maneuver or change their lighting sequence to display O, then K, and finally E. This way, one can obtain better resolution for the individual letters without having to increase the number of satellites. Another advantage is making do with a limited amount of energy per satellite. Suppose twelve satellites are to display "COKE"™. Suppose they each have enough energy for twice participating in showing a letter. Then, the first six can display C, and then O. Then the other six can display K and then E.

In a further embodiment, there may be provided an array of say 4×4 or 5×5 satellites that selectively light up in patterns that display a subsequent letter each time.

A further method is referred to as the dropped elements method. This method is similar to the point source swarm flight. The difference is that satellites drop sub-satellites that are not self-maneuverable. They do however act as display elements, which are dropped into place by the active maneuverable satellites and can be activated either via broadcast or by pre-determined timers. There are two kinds of such elements: recoverable and non-recoverable. The recoverable ones may be collected at the end of the display period by the maneuverable satellites. The non-recoverable ones may typically self-destruct by decaying within a few years due to atmospheric drag, and burn in the atmosphere. Self-destruction may be quickened by providing acceleration towards earth. It should be noted that the accuracy of the display here may be less than that of the point source swarm flight due to drift effects.

In one embodiment the dropped elements may simply be flares which are released from the satellites when in formation and which remain lit until burned out and burned up.

A further method is the mother ship method. In both the point source and dropped element methods, certain resources may be exhausted or may fail. For example, fuel for maneuvering may run out, a satellite's control electronics or communication electronics or motors may malfunction, non-maneuverable elements may be lost, lamps may fail and the like. One temporary solution is launching a larger satellite that will hold such resources and dispense them as required. An alternative is to start off with extra resources in terms of redundant elements on individual satellites or additional satellites, and to launch additional ones as needed. But, because launch dates are not always predictable, this may render the system as non-operational at times. Putting these two together, a mother ship, that is a larger satellite with the maneuverability to service the nano satellites, plus occasional replenishment, may improve long term system reliability.

Figure 6:
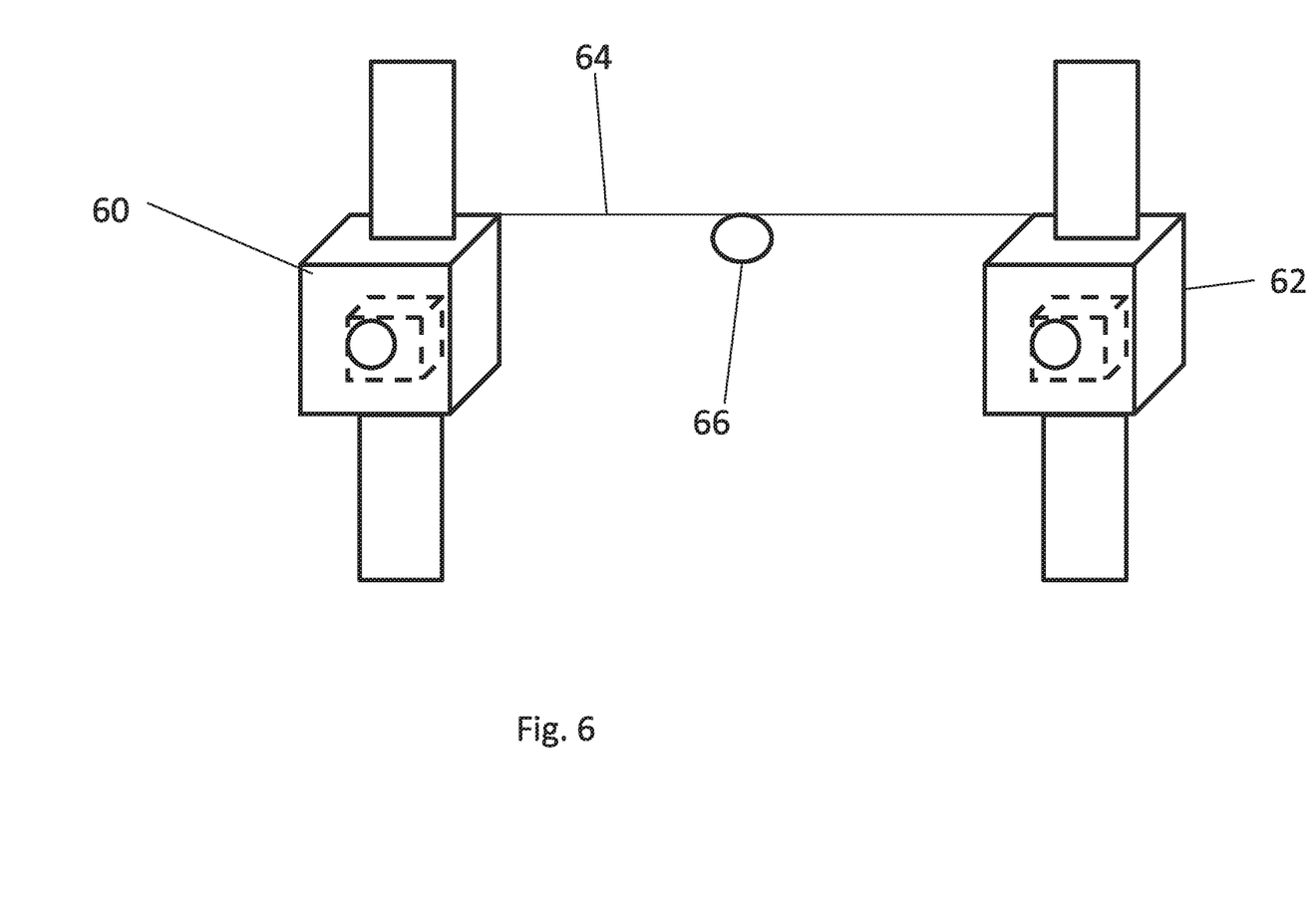
FIG. 6 is a simplified diagram illustrating two satellites with a wire between them and an illumination element mounted on the wire according to an embodiment of the present invention.

Reference is now made to FIG. 6, which is a simplified diagram illustrating two satellites 60 and 62 with a wire 64 between them and a lamp 66. A further method, using the arrangement of FIG. 6 is known as the wires method. The idea here is to improve the pixel resolution available from a fixed number of satellites beyond the points available on the satellites or sub-satellites themselves. Here the satellites are connected via lightweight wires. These wires have sections that can be lit so as to be viewable from earth, typically carrying their own LEDs. The placement technique is similar to the arrays used above, and energy is supplied from the wire-end-point satellites. The wires, if somewhat stiff, can also be used to maintain the structure of the array, so that individual satellites do not drift.

Figure 7:
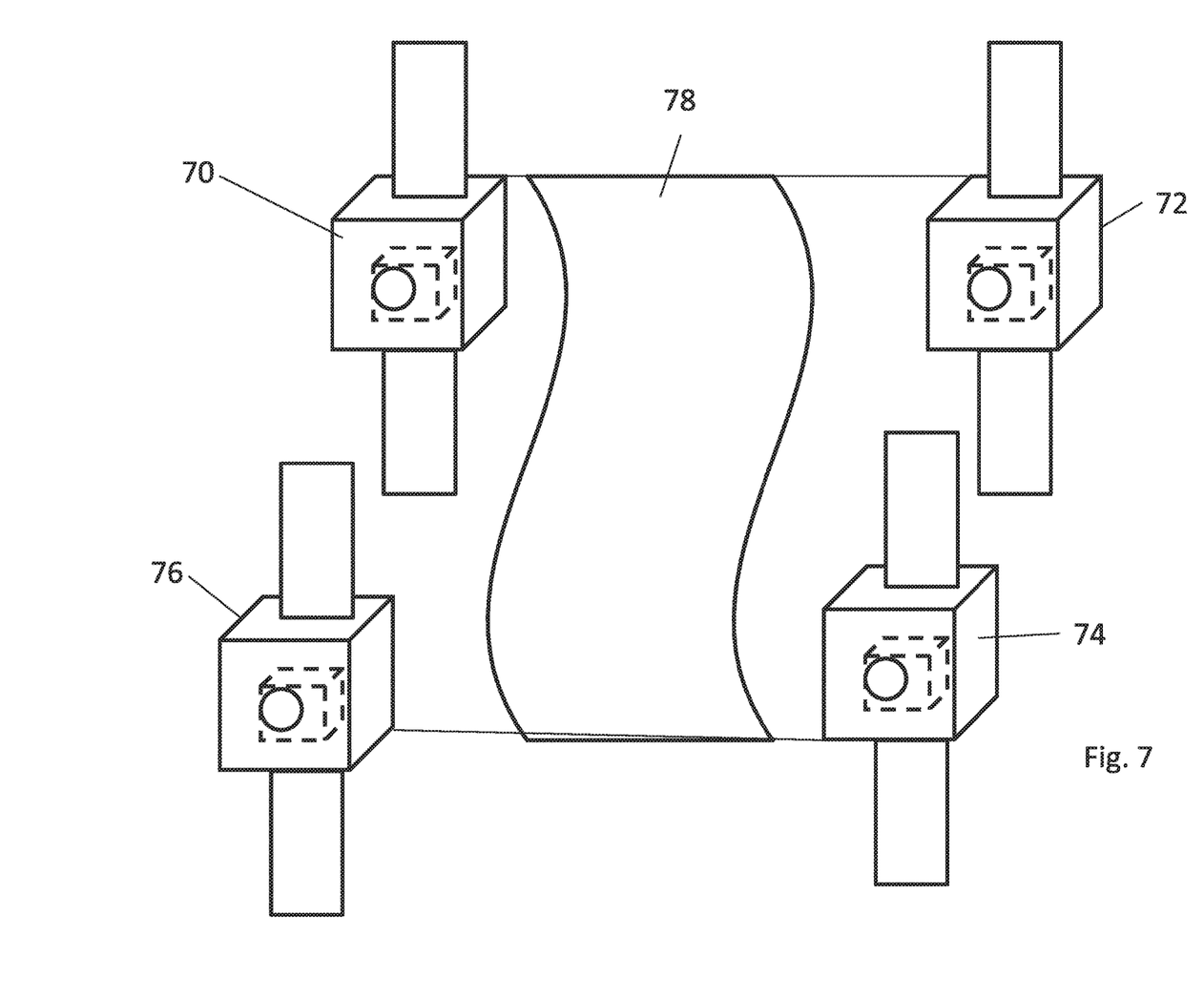
FIG. 7 is a simplified diagram illustrating four satellites with a sheet suspended between them according to an embodiment of the present invention.

Reference is now made to FIG. 7. Shown schematically and not to scale, four satellites 70, 72, 74 and 76 hold a sheet 78 between them. A yet further method using the arrangement of FIG. 7 is the sheet method. In the sheet method a thin sheet of a large size (say, 1 km by 1 km) is deployed via maneuverable satellites. As the sheet can be heavy (at 0.1 gr per meter squared, a 1 km by 1 km sign would weigh 100 kg), a highly porous structure is preferable. The sheet may be launched separately, as stand-alone cargo or with the mother ship satellites. The sheet may either have a message built in or may be a switchable matrix. Switching may involve switching particular lamps on and off, which serve to make parts of the sheet visible and other parts invisible. New sheets can be deployed as required. The technology for achieving this effect may be that used for large solar panel deployment in space.

Figure 8:
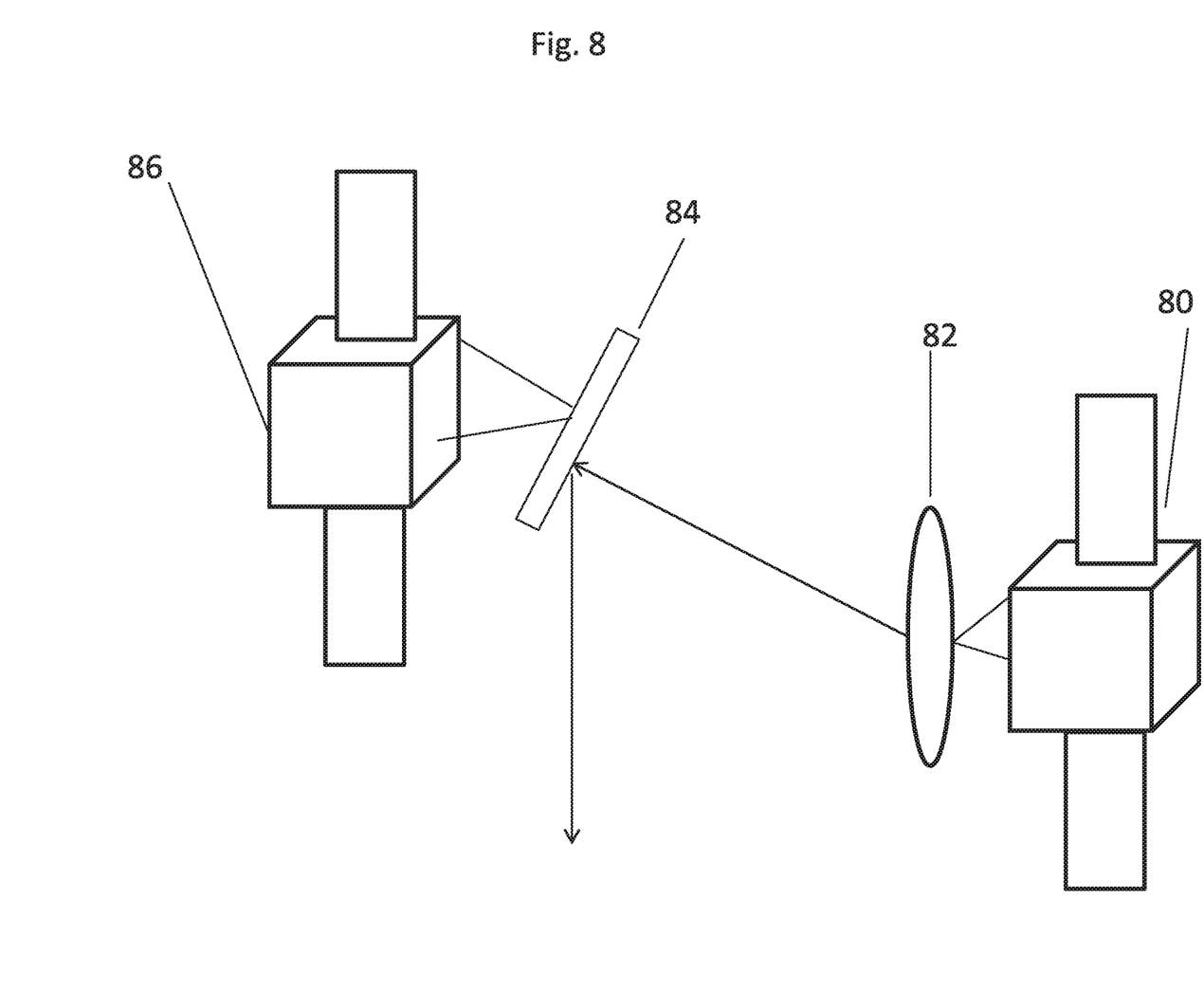
FIG. 8 is a simplified diagram illustrating two satellites with a lens and mirror for redirecting sunlight to illuminate an event according to embodiments of the present invention.

Reference is now made to FIG. 8, in which a first nanosatellite 80, in reality an array of satellites, focuses light from the sun using a lens 82 onto a mirror 84 held by another satellite 86—again in reality an array. The mirror reflects the light to the ground and thus provides the illumination event. The second satellite is on the dark side of earth but the first satellite is in the path of the sun's rays, so that light is directed to the ground by the second satellite to provide illumination for an event method is the lens and mirror method. In this method there are two arrays or swarms of satellites. Some satellites, "swarm L" possibly being or including the mother ship if there is one are in sun-facing positions while others are in a dark area, hereinafter "swarm D". Swarm-L satellites collect sunlight, focus it via lenses, and direct it to the swarm D satellites. The swarm D satellites use mirrors to directly display the focused light towards earth, as per the point source method, to create a continuous display of the sign. The same can be done for the dropped element method. For the sheet method, the sheet itself may be blank and the swarm L satellites can project directly onto the sheet, the sheet will illuminate at the respective points and the result may be visible from earth.

The following describes certain system elements:

Formation: In order for the unaided eye to capture a pattern in the sky, it needs to be sufficiently large. A typical human eye can resolve 1 minute of arc ($\frac{1}{60}$ deg.) At a distance of 600 km, this makes for 200 m resolution elements. Hence, at least 200 m should be the typical distance between satellites. Any letter of the alphabet can be graphically depicted using a 4×4 (or 5×5) array of points implying a cluster of 16 (25) satellites spanning a region of approximately 1 km×1 km.

Control System: The control system, for any of the abovementioned Methods, is in charge of receiving display missions from earth and carrying them out. The control system may be pre-programmed, reside on one or more of the satellites, or on the mother ship (when there is one) or may reside on the ground, with instructions being relayed to one or all of the satellites.

As during most of the LEO orbit the satellites are not in sight of any particular ground station, it is necessary to at least partially run the control system autonomously from space.

Energy: The energy to display the sign via intense light may be gathered using photovoltaic panels. The energy may be accumulated in a battery and discharged in short duration bursts, that is of a few minutes, to achieve visibility from earth. This is also the case for sub-satellites that may receive energy from the satellites or independently.

Human scotopic vision is sensitive to less than 100 visible (say green) photons per second, or the light power of $\sim 3 \times 10^{-10}$ erg $s^{-1} \cdot 3 \times 10^{-17}$ W. These photons need be captured by the pupil of the human eye (the "reception area"). Given that the area of the human pupil in the dark is slightly less than 1 cm$^2$, this implies the unaided eye is able to identify in darkness a light source that shines on the eye an energy flux of $\sim 5 \times 10^{-10}$ erg $s^{-1}$ cm$^{-2}$ or $5 \times 10^{-17}$ W cm$^{-2}$. Noting that the atmospheric transmittance of visible light is 50%-60%, but varying with latitude, humidity and pollution, we may require the satellites to emit an energy flux F of $10^{-9}$ erg s$^{-1}$ cm$^{-2}$=10$^{-16}$ W cm$^{-2}$. Since the satellites are at a distance of d=600 km above the ground (stable LEO orbit), and emit unbeamed light (in order to be visible over a large area on the ground), the power P they are required to shine downwards (half sphere surface area is $2\pi d^2$) is P=$2\pi d^2$F, which is just above 2×10$^7$ erg s$^{-1}$, or 2 Watts of light. A LED connected to the satellite battery could produce a few Watts of light for a few minutes before the satellite moves out of sight, and the battery can be recharged. At certain observing angles, reflective panels on board the satellite would further augment the electrically produced luminosity.

Cubesat batteries may be able to light LEDs of several dozen Watts, which would make the signs all the more visible from Earth, over a larger area of ground, and allow for higher and thus more stable orbits. As LED technology improves brighter and longer lasting signs can be displayed from space.

The system using the array of satellites may produce display events. Given n display events to be shown, the events may be processed as follows:

a. A naïve simulation mode in which, based on the expected positions and energy contents of the satellites, a plan is produced and is assumed to perform perfectly with no deviations.

b. A realistic simulation mode in which, based upon system learnt parameters, deviations are probabilistically introduced and a Tracking function applies corrections. The success probability is estimated and if larger than P % (P is expected to be 99%) the plan is certified and carried out.

c. If the plan is not certified, an event is chosen and deleted from current consideration and the resulting sequence is re-considered. The deleted event may then be inserted in another batch, as required.

d. Next, a plan is produced and tracked in real time, in the naïve mode in which everything is performed perfectly. In the realistic simulation mode, a module provides the simulated measurements. In an actual execution, as displayed below, the performance is real and is carried out after the plan is certified. The actual performance in effect reproduces the plan or a variation thereof in real time, based on the up-to-date state of the system.

Viewing Events Management

Figure 9:
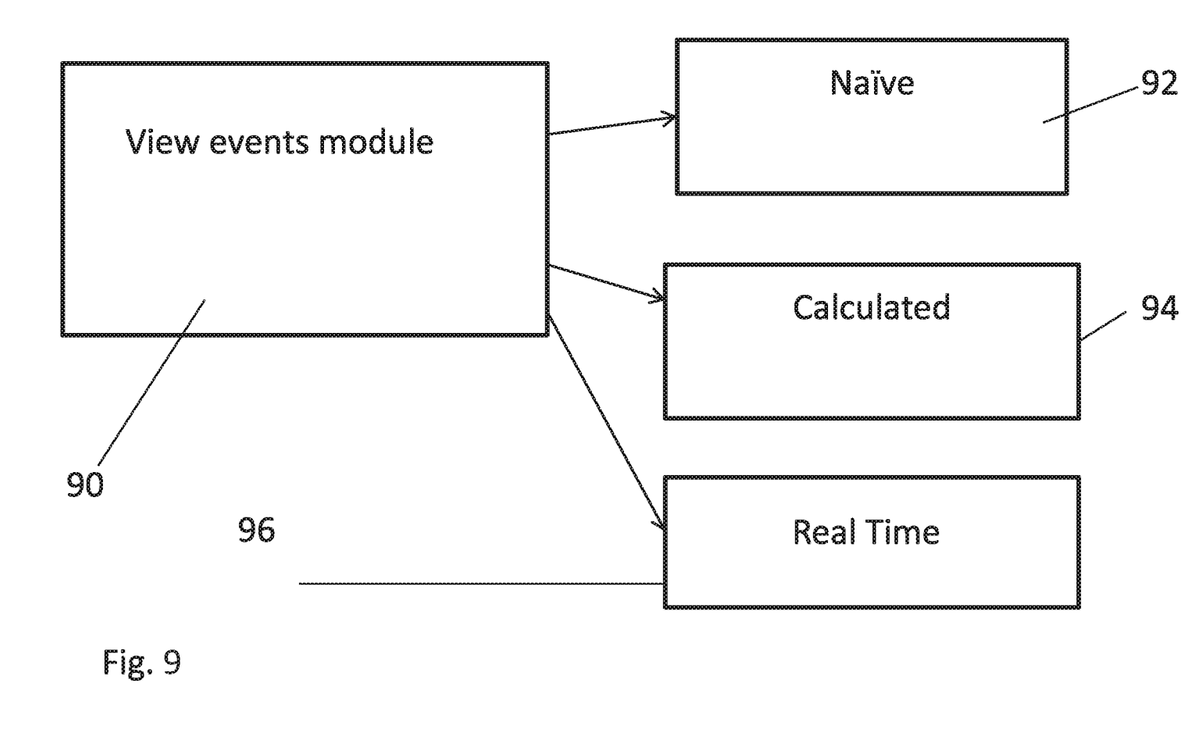
FIG. 9 is a simplified diagram illustrating a module for scheduling and controlling events according to an embodiment of the present invention.

Reference is now made to FIG. 9, which illustrates a viewing events management module 90 according to an embodiment of the present invention. The module is used in the naïve simulation 92, and then also in a realistic simulation 94 where system measurements are simulated, and in the real-time mode 96 to actually carry out the batch.

Some important variables and parameters are as follows:
Positions could be 3D or 2D (angles) time-dependent vectors in a non-rotating geocentric coordinate system.
pe—position of highest priority target for viewing display on earth.
pcom—best estimated position of center-of-mass of satellite cluster.
pi—position of the I'th satellite with respect to pcom, e.g. from GPS.
ei—energy content in the I'th satellite, in ergs.
vi—velocity vector of the I'th satellite with respect to coordinate system (in km/s).
t—system time in microseconds.
e.next—the next display event.
ej—the j'th display event, ordered by display start time expressed in system time units.

Structure of a display event e:
A display event in the event module may be structured as follows:

1. e.start.position Event start position in system coordinates.
2. e.start.time Event start time.
3. e.start.time.boundary a pair of values indicating tolerance for start time.
4. e.end.time.boundary a pair of values indicating tolerance for end time.
5. e.end.position Event end position in system coordinates.
6. e.end.time Event end time.
7. e.special.effects Special effects (blink, spike, fade, . . . ).
8. Visibility level (L, M, H) at target viewing position.
9. e.ns Number of satellites to be employed.
10. For j=1 to ns, let pj be the position, relative to pcom of the j'th participating satellite. pcom should coincide initially with e.start.position, and at the end of the event with e.end.position. It is designed to provide the best visibility at pe.
11. e.me Maximum amount of energy units in ergs to be used.
12. e.start.2.position Secondary start position.
13. e.start.2.time Secondary start time.
14. e.end.2.position Secondary end position.
15. e.end.2.time Secondary end time.
16. e.start.2.time.boundary a pair of values indicating the tolerance for start time.
17. e.end.time.2.boundary a pair of values indicating the tolerance for end time.

Parameters 11-17 are intended for use when the primary event can not be carried out, and a secondary one is loaded to the system for back up. More than one secondary set of parameters can be loaded to the system.

Structure of a command c to the satellite:
A command to a satellite may be structured as follows:
1. c.start.time—Command start time in system time.
2. c.thrust—Command module, which activates thrusters. Includes nozzles, direction, and time of activation.
3. expected start.position—expected position in system coordinate system before activation.
4. expected end.position.after.activation—expected position in system coordinate system after activation.
5. expected.energy.used—expected energy in ergs to be used.

In order to reach a desired position at a desired time, the satellite may be issued a sequence of such commands.

Produce Flight Plan

A flight plan may be produced as follows:
input: A sequence e1, . . . , en of display events each with its fields according to the structure.
Output: A sequence of instructions with the format above.
Method:
a. Estimate calculation time calc.time in microseconds;
b. now=t; /*Now is current system time*/
c. /*The execution starting time for the events is estimated or calculated thus:*/
d. Calculate position pi of all satellites i at est=now+2*calc.time; /*precaution*/
e. Handle events in sequence starting with e1, let e be the currently treated event;
    a. For each satellite i calculate a trajectory that will bring satellite i to the location indicated by e.start.position at time e.start.time; For each such trajectory, calculate the expected energy usage ui by satellite i;
    b. For some satellites such a trajectory will not be possible as they are either engaged on other missions, that is marked as busy up to a later point in time than e.start.time, so they cannot participate, or they may be unable to participate due to physical limitations, including energy and speed.
c. Choose a group G of ns satellites so that the remaining energy content of a satellite in G after reaching e.start.position is as large as possible (maximal); /*The heuristic used is that all satellites reaching the start of display position have sufficient energy to actually make the display*/
d. Verify that the group satellites have sufficient energy to actually make the display;
e. If not then do the following:
   i. If e is marked "not performed" issue a notification that e will not be executed in this batch and delete e from the sequence;
   ii. Otherwise, e is marked "not performed" and will be considered with its secondary display option later on, it is simply added to the end of the sequence and the secondary attributes replace the primary ones and the next event is considered;
f. For ease of notation the satellites in G are sj, j=1 . . . e.ns;
g. For satellite j, issue a sequence of commands to satellite j whose execution starts at est so that at time e.start.time the sequence will position j in the viewing circle position j where the circle's center coincides at that time with e.start.position;
h. Use a method for a display action, herein referred to as 'generateCircleViewing' that outputs a sequence of commands so that for the duration of e satellite j will perform the display functionality required of the j'th satellite in the group performing e. Update the expected energy level after performing the event; indicate that the satellite j is busy until e.end.time+DELTA; /*DELTA is a precaution system constant, about 30 seconds*/
i. Delete e from the sequence;
j. /*At this point commands are issued to perform event e*/
k. At this point /*real data refers to calculated results in simulation mode, to system generated simulation data in simulation mode and to actual data in real time execution mode*/:
   i. Update energy content now for all satellites; /*real data*/
   ii. Update the position of all satellites; /*real data*/
   iii. Update energy content for busy satellites at the end of their busy period;
   iv. Update expected location for busy satellites at end of their busy period;
   v. Delete any malfunctioning satellites temporarily from consideration.
   vi. If the sequence is empty, then move to tracking mode, verifying the plan is properly executed and alerting ground control to malfunctions;
   vii. Otherwise, handle the next event in the sequence;

Tracking

Tracking compares the actual position and energy levels of satellites at frequent time intervals. In between tracking measurements, standard orbit propagation codes can be used (e.g., the satellite System Tool Kit (STK)). Note that the energy content may increase due to photovoltaic energy production or due to other possibilities of energy infusion such as direct laser charging.

When tracking a busy satellite, based on actual positions, correcting commands may need to be issued so as to carry out the relevant event e as close as possible to the plan. For example there may be a need to accelerate members of a group displaying an event e, there may be a need to reschedule the event start time if indicated as possible, that is if there is a possible time that lies within the specified time boundary e.start.boundary, and the same may apply for the end time e.end.time.

Aside from issuing such commands, Tracking may involve keeping a detailed system log of all commands issued and all statuses recorded. Red alert events, such as a satellite malfunctioning, are flagged in real time to the tracking management team.

Altering

During execution there may be a need to alter the plan. For example, a display for an outdoor event is canceled due to weather conditions. For simplicity, assume cancelled events are not currently executing ones, namely they are to be executed in the future and there is sufficient time to calculate a new plan. The idea is to delete from execution all commands on behalf of non-executed events from the plan. Then, the events are reintroduced and a new plan for them is constructed based on the current positions and the positions at the end of busy times.

Use of Non-visible Light

The above embodiments have been described as using visible light, and allowing naked eye viewing. However it is also possible to provide a display for only visible by telescope and also to provide a display that is based on non-visible wavelengths of light such as infra-red, and particularly the near-infra-red. Generally UV light is highly absorbed in the atmosphere. A display that is based on non-visible light, for example infrared, may (a) somewhat reduce energy consumption, and (b) more importantly, may eliminate light pollution in space which may be subject to laws or regulations. In the case of non-visible light special devices may be provided to view the display.

Use of UAV's

The above embodiments have related to satellites in orbit. However, light patterns could also be created using a formation or a swarm of craft flying in the atmosphere such as unmanned aerial vehicles (UAVs). UAV's may be subject to different regulation regimes from satellites, and the formations may be located closer to the ground, thus allowing the same illumination for less energy output. UAV's can also use non-visible wavelengths and unlike with satellites, UV light can reach the ground without being absorbed. The UAVs are typically unmanned and may be controlled from the ground. Alternatively a manned aircraft may be used to control a swarm of UAV's. Control may be direct, or in the case of the manned aircraft may be implicit, by having the UAVs follow the cues of the leader airplane.

It is expected that during the life of a patent maturing from this application many relevant nano satellites and nano-satellite control systems will be developed and the scopes of the corresponding terms are intended to include all such new technologies a priori.

The terms "comprises", "comprising", "includes", "including", "having" and their conjugates mean "including but not limited to".

The term "consisting of_" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of controlling a plurality of unmanned aerial vehicles to fly in coordinated manner, the method comprising:
    arranging said plurality of unmanned aerial vehicles in a flying formation, each of said unmanned aerial vehicles comprising an illumination element; and
    operating selected ones of said illumination elements to produce an illumination event detectable at a predetermined ground location, the selection of said illumination elements being based on a perspective of said predetermined ground location to produce a predetermined view at said ground location, said view being formed according to said perspective using said selected illumination elements, said perspective being based on a distance of said unmanned aerial vehicles from said ground location, said controlling comprising spacing said illumination elements at a distance apart from one another, wherein said distance subtends an angle at said ground location of at least one minute of arc.

2. A control system for controlling a plurality of unmanned aerial vehicles to fly in coordinated manner, the control system comprising:
    a flight formation control unit configured to control an array of unmanned aerial vehicles in flight to attain a flight formation;
    a display coordinator configured to operate selected illumination elements on said unmanned aerial vehicles to produce an illumination event detectable at a predetermined ground location, the selection of said illumination elements being based on a perspective of said predetermined ground location to produce a predetermined view at said ground location, said view being formed according to said perspective using said selected illumination elements, said perspective being based on a distance of said unmanned aerial vehicles from said ground location, said controlling comprising spacing said illumination elements at a distance apart from one another, wherein said distance subtends an angle at said ground location of at least one minute of arc.

3. The control system for controlling a plurality of unmanned aerial vehicles to fly in coordinated manner of claim 2, being ground-based.

4. The control system for controlling a plurality of unmanned aerial vehicles to fly in coordinated manner of claim 2, being air-based.

* * * * *